May 9, 1950     C. SCHINDLER ET AL     2,506,744

RETARDED CIRCUIT BREAKER AFTER RECLOSING

Filed Jan. 10, 1945     5 Sheets-Sheet 1

INVENTORS
CARL SCHINDLER
OLAV FROLAND
BY
Arthur R. Woolfolk
ATTORNEY.

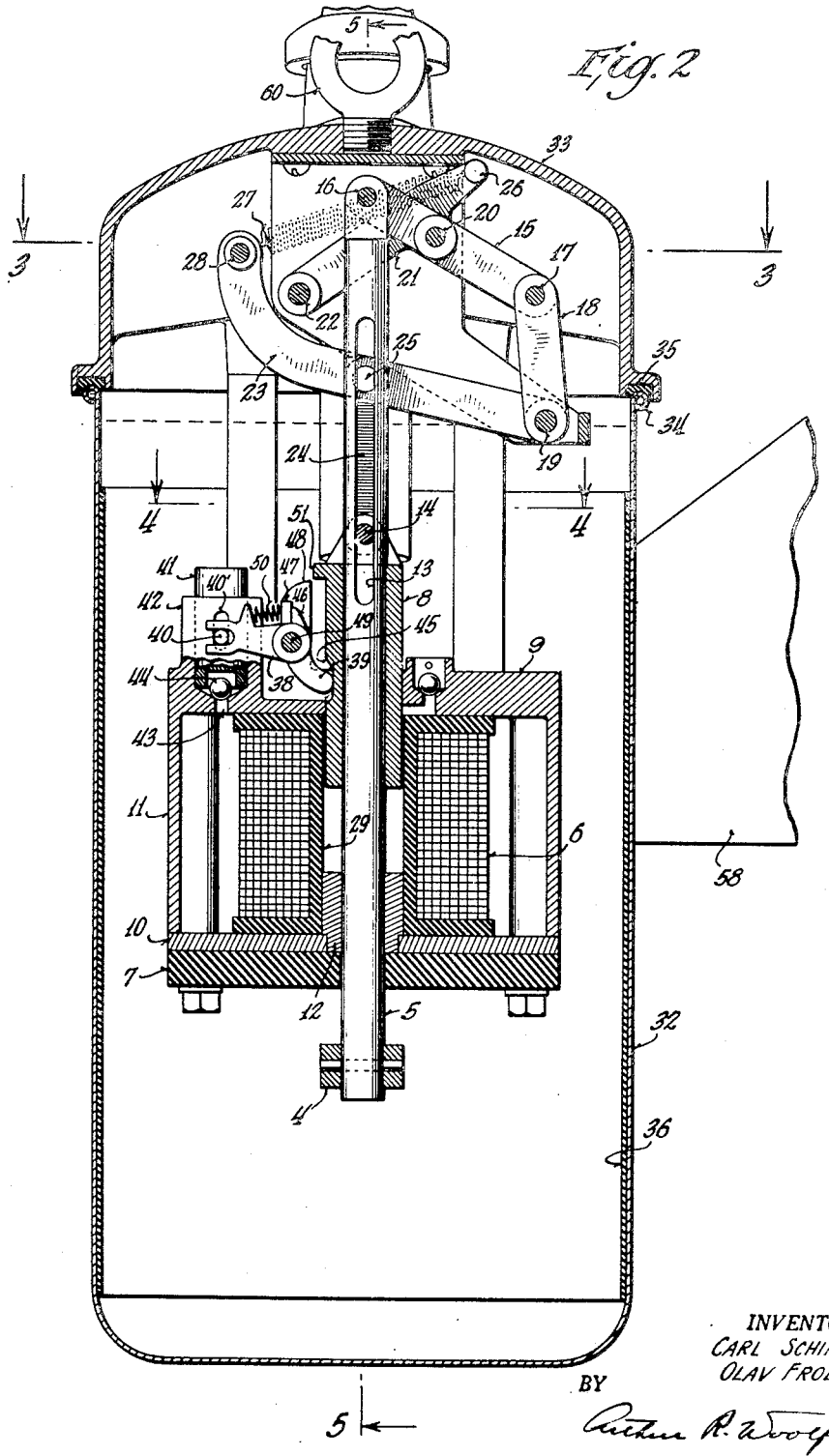

May 9, 1950     C. SCHINDLER ET AL     2,506,744
RETARDED CIRCUIT BREAKER AFTER RECLOSING
Filed Jan. 10, 1945     5 Sheets-Sheet 3
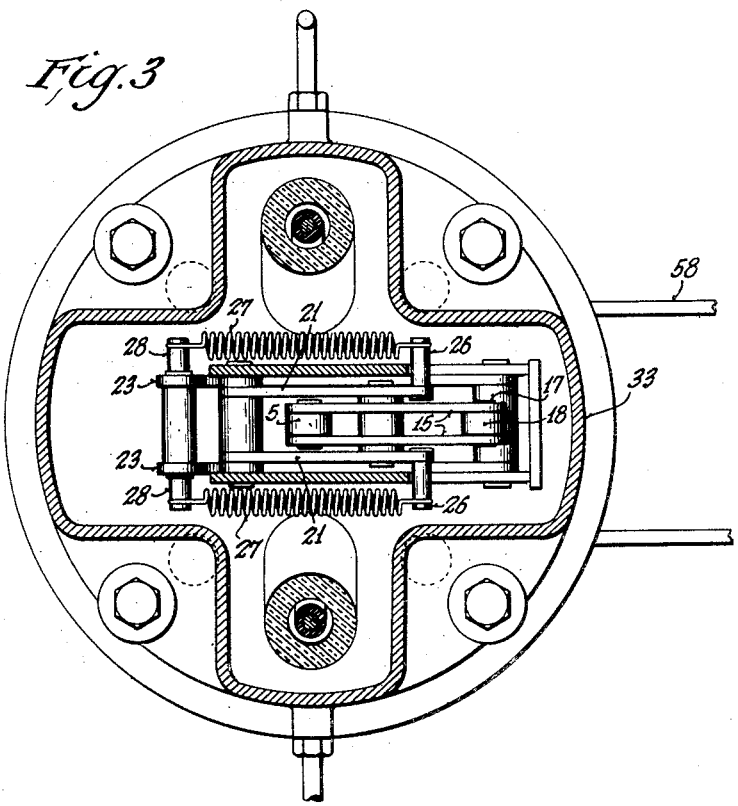
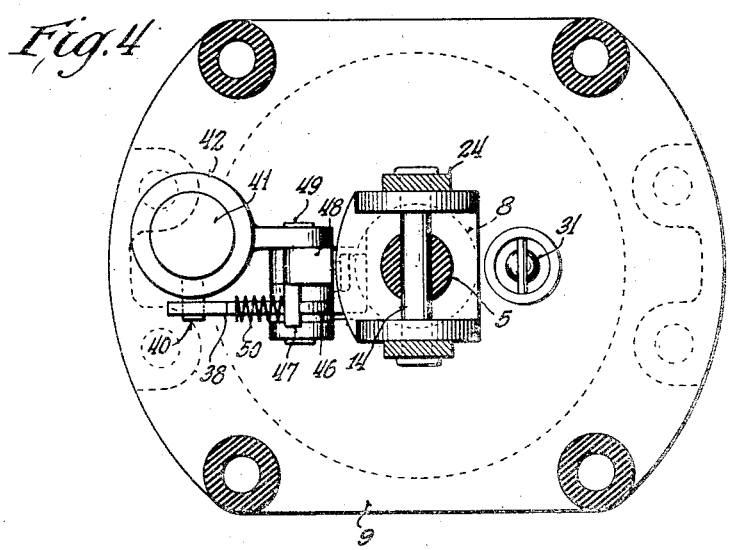
INVENTORS
CARL SCHINDLER
OLAV FROLAND
BY
ATTORNEY.

May 9, 1950 C. SCHINDLER ET AL 2,506,744
RETARDED CIRCUIT BREAKER AFTER RECLOSING
Filed Jan. 10, 1945 5 Sheets-Sheet 4

INVENTORS
CARL SCHINDLER
OLAV FROLAND
BY
ATTORNEY.

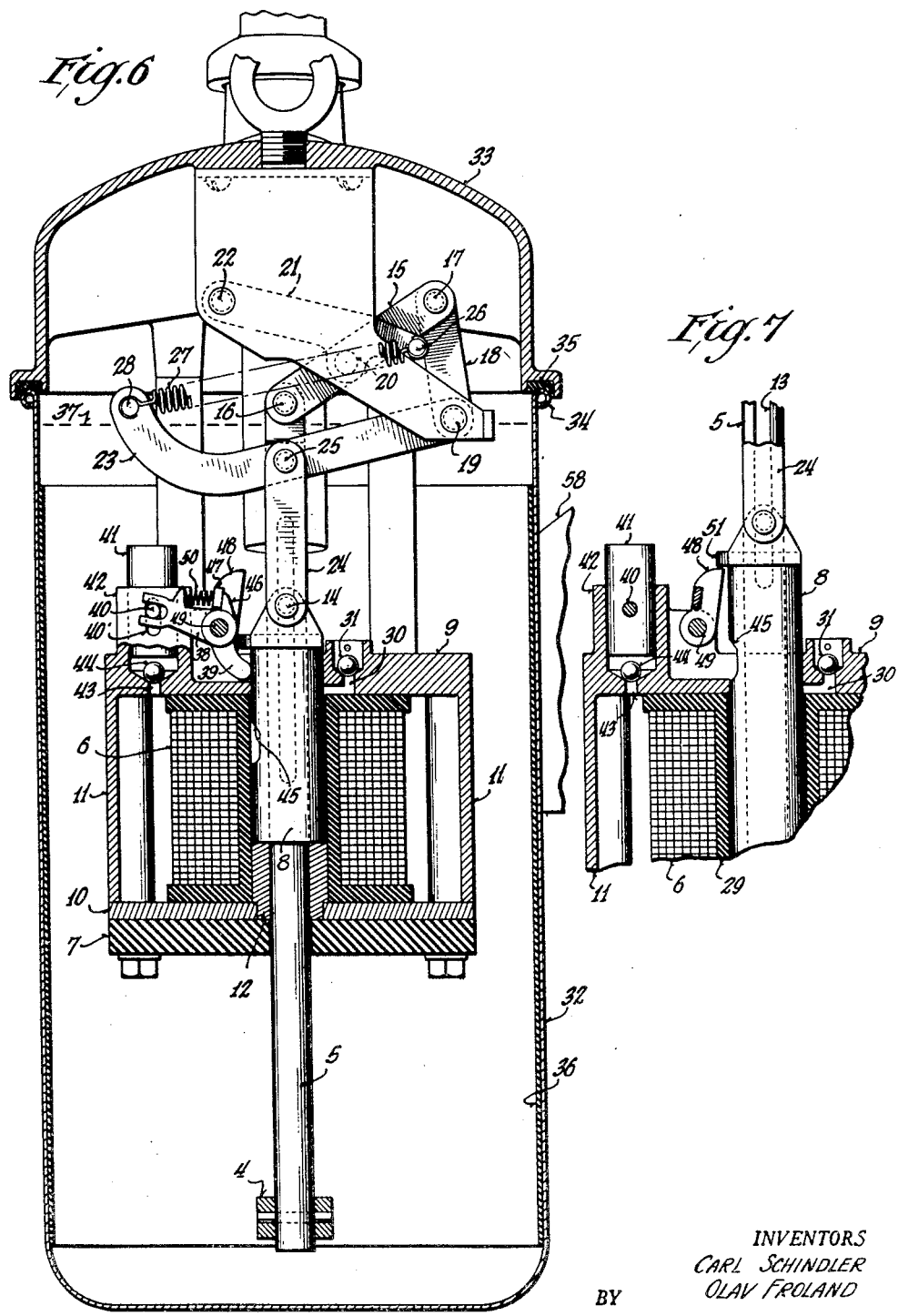

Patented May 9, 1950

2,506,744

UNITED STATES PATENT OFFICE 2,506,744

RETARDED CIRCUIT BREAKER AFTER RECLOSING

Carl Schindler, Wauwatosa, and Olav Froland, Milwaukee, Wis., assignors to McGraw Electric Company, a corporation of Delaware Application January 10, 1945, Serial No. 572,208

2 Claims. (Cl. 200—89)

This invention relates to an automatic circuit interrupter and to a distribution system.

It has been found that on distribution systems 85% to 90% of all faults occurring are due to temporary conditions which will be removed if the service is temporarly interrupted. Various types of reclosing circuit interrupters have been made and arranged to open the circuit and reclose it after a suitable interval of time following a fault or overload, and these circuit interrupters usually repeat a predetermined number of times and lock out thereafter. However, such devices are expensive and their cost is prohibitive for use on small branches of distribution systems where the loads are light such as, for instance, on rural distribution systems.

This invention is designed to provide a circuit interrupter which is so made that it has one quick circuit interrupting operation followed by a delay before quick reclosing, and which is so constructed that it locks in closed position so that if the fault remains, a fuse positioned in the branch on which the fault exists will blow and thus clear the line.

Further objects are to provide a circuit interrupter which is so made that it will have a quick opening stroke when a fault occurs and after a suitable interval of time will have a quick closing stroke and will thereafter automatically lock itself in closed position, the locking mechanism being so arranged that it has time delay action and will release and reset itself automatically in its initial position after a predetermined interval of time so that the circuit interrupter is again in its initial condition and capable of going through another cycle of operations.

Further objects are to provide a circuit interrupter which is oil immersed, which is mounted within a can and suspended wholly from the top of the can, and which is so arranged that it may be removed from the can for inspection or repair without disturbing any portion of the mechanism of the circuit interrupter and without disturbing the can, the can remaining mounted on the pole or any other suitable support, the construction allowing the can to be made without any openings except at the upper portion of the can so that there is no danger of loss of oil therefrom.

Further objects are to provide a circuit interrupter in which the contact assembly is spaced from the quick motion mechanism, the specific arrangement having the contact assembly located below the magnet coil and the quick motion assembly located above the magnet coil, the quick motion mechanism insuring a quick opening and a quick closing and the plunger of the magnet assembly being so arranged that at the instant the spring of the quick motion mechanism is passing dead center, the plunger strikes the switch operating member a severe blow to start the movable parts of the switch assembly at a very high speed, such speed being maintained and increased by the action of the quick motion mechanism.

Further objects are to provide a circuit interrupter which is of very simple construction and which has relatively few and easily produced parts and which may be cheaply manufactured.

An embodiment of the invention is shown in the accompanying drawings, in which:

Figure 2 is a sectional view on the line 2—2 of Figure 1 showing the circuit interrupter in closed position.

Figure 3 is a sectional view on the line 3—3 of Figure 2.

Figure 4 is a sectional view on the line 4—4 of Figure 2.

Figure 6 is a view corresponding to Figure 2 showing the circuit interrupter in its temporary full open position.

Figure 7 is a fragmentary sectional detail view showing the parts in the position which they occupy when the circuit interrupter is locked closed.

Figure 1:
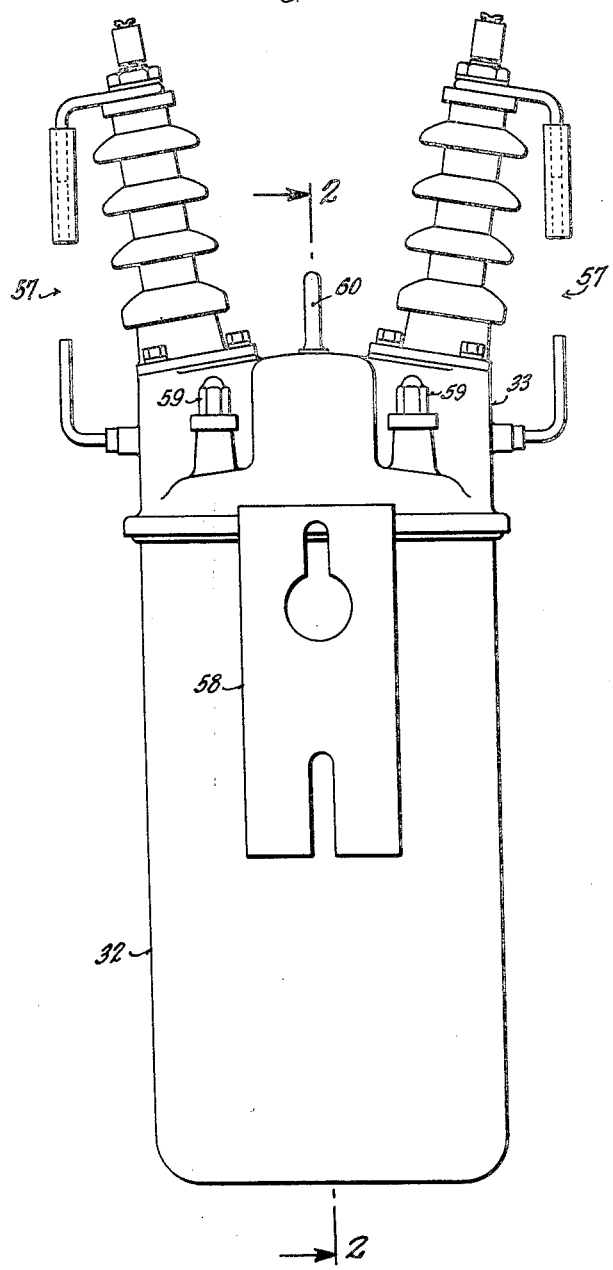
Figure 1 is a side elevation of the circuit interrupter.

Referring to the drawings, it will be seen that the circuit interrupter comprises a contact assembly indicated generally by the reference character 1 and comprising a pair of spaced stationary contact members 2 adapted to be engaged by movable contact members 3 carried by a conducting bridging member 4. The bridging member 4 is carried by means of an operating rod 5 which latter is formed of insulating material and is slidably guided through the central portion of the magnet winding 6. The stationary contacts 2 are mounted on an insulating base member 7 secured to the lower portion of the magnet assembly. The magnet assembly includes a movable magnetic plunger or armature 8 which surrounds the rod 5. The magnet plunger 8 is freely slidable with respect to the rod 5 and slides downwardly when the magnet coil 6 is energized from the position shown in Figures 2 and 5 to the position shown in Figure 6.

The stationary portion of the magnet assembly includes the energizing coil 6, the upper yoke 9, and the lower yoke 10, such yokes being formed of magnetic material and the upper yoke having downwardly extending portions 11 on opposite sides thereof, see Figure 6. If desired, a small upwardly projecting extension 12 of the lower yoke 10 may be provided, such extension 12 being formed of magnetic material.

Figure 5:
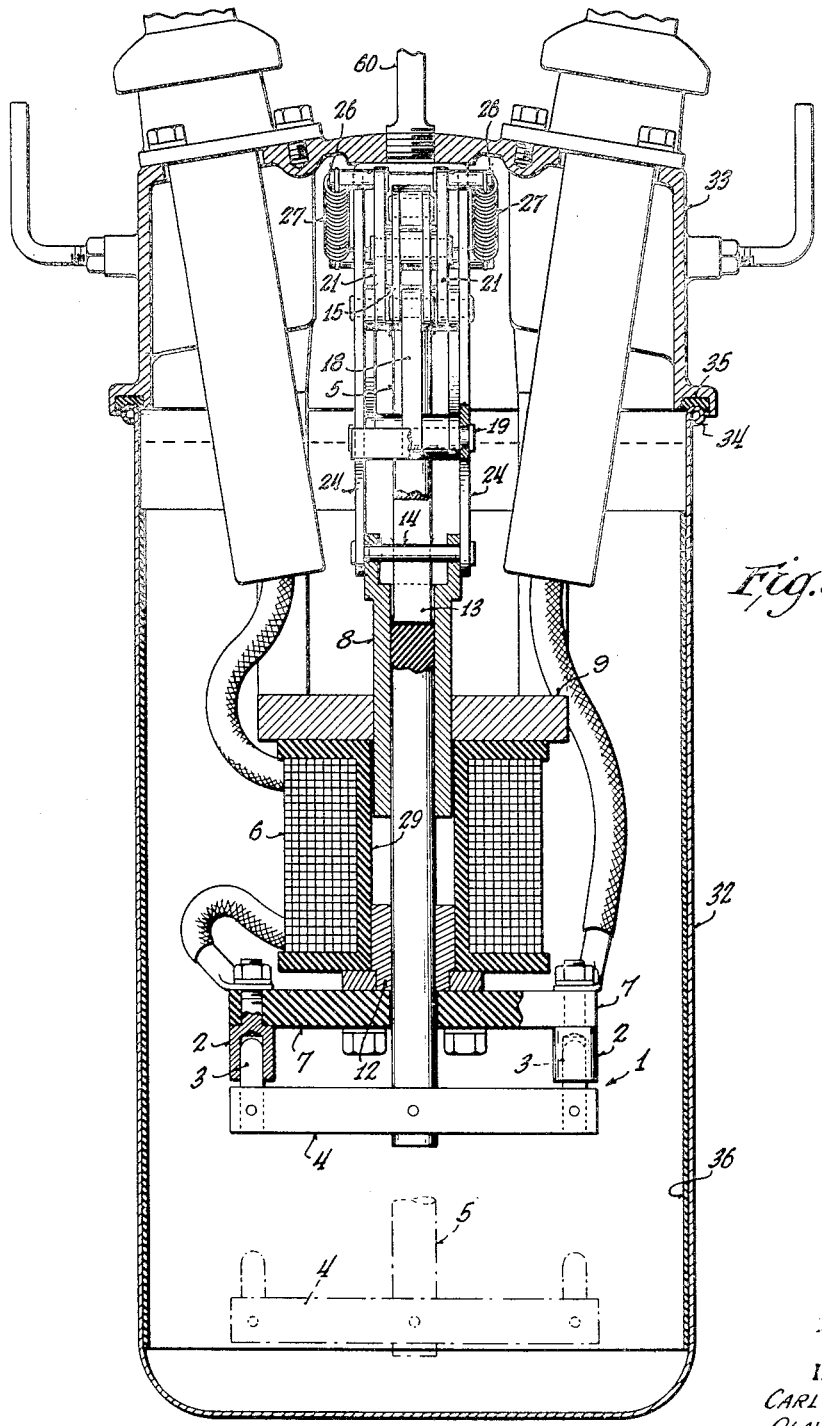
Figure 5 is a sectional view on the line 5—5 of Figure 2.

The insulating switch operating rod 5 is slotted as indicated at 13, see particularly Figures 2 and 5, and a transverse pin 14 carried by the upper end of the plunger 8 extends through the slot and freely slides therein.

The upper end of the insulating switch operating member or rod 5 is guided by means of an approximate straight line motion mechanism which consists of a lever 15 pivoted at one end by means of a pivot 16 to the upper end of the rod 5 and at its other end by means of a pivot 17 to a link 18, such link being pivoted at a stationary pivot 19, see Figures 2 and 6. An intermediate point of the lever 15 is pivoted as indicated by the reference character 20 to a lever 21, the lever 21 being pivoted at a fixed pivot indicated at 22. A lever 23 is arranged to be directly actuated by means of the plunger 8 and is connected to the pin 14 by means of links 24, such links extending from the pivot 25 intermediate the ends of the lever 23 to the pin 14 carried by the plunger, as shown in Figure 6.

It is preferable to form each of the levers 15, 21, 23, and 24 of a pair of members as shown in Figure 3, such members constituting together in each instance a single lever construction.

The lever composed of the members 21 is provided with a pair of pins 26 which are joined by means of tension springs 27 to the outwardly projecting ends of a pin 28 carried by the lever 23. It is preferable to slightly groove the pins 26 and 28 in order to retain the eyeleted ends of the springs 27 in accordance with the usual practice.

The mechanism hereinabove described constitutes a quick motion mechanism. The operation of this mechanism is as follows: Assuming that an overload occurs, the magnet winding 6 will be sufficiently energized to draw the plunger or armature 8 downwardly. This downward motion of the plunger rocks the lever 23 from the position shown in Figure 2 to the position shown in Figure 6 and consequently the line of pull of the springs 27 passes across the center of the pivot 22 or, in other words, passes across dead center. However, at approximately the instant the spring is passing dead center, the pin 14 carried by the rapidly moving plunger strikes the bottom end of the slot 13 of the switch operating rod 5 and initiates the opening motion of the switch with a very quick stroke, the springs 27 completing the quick opening stroke of the switch. The lever 23 immediately starts to move towards its initial position as the line of pull of the springs 27 is above the pivot 19 of the lever 23. This continues until the lever 23 has arrived at its initial position, as shown in Figure 2. However, near the end of the upward rocking motion of the lever 23, the line of pull of the springs 27 passes across the center of the pivot 22 and consequently rocks the lever 21 upwardly with a quick motion in turn rocking the lever 15 and raising the switch operating rod or member 5 and thus closing the switch with a quick motion. It is to be noted, however, that inasmuch as the magnet coil and switch are submerged in oil in a manner hereinafter described, the upward motion of the plunger is delayed as it has to draw oil into the space below the plunger. The plunger 8 is spaced slightly from the fiber tube 29 of the winding 6 and the oil freely flows around the sides of the plunger on the downward stroke of the plunger and is freely exhausted through the exhaust opening 30 past the downwardly seating check valve 31, see Figure 6. However, on the up stroke the valve 31 seats and delays the upward stroke of the plunger as the oil has now to leak around the sides of the plunger past the upper yoke 9 and the clearance at this point is relatively small. The upward stroke of the plunger is, therefore, delayed and consequently there is a delay between the opening of the switch and the closing of the switch. However, when the switch does start to close as hereinabove described, it has a very quick closing stroke due to the quick motion mechanism.

The circuit interrupter is mounted within a metal can 32 and all of the parts are supported from the top 33 of the can, the top being seated on a beaded upper edge 34 of the can and a suitable gasket 35 being interposed. Preferably the lower portion of the can is lined with fiber as indicated at 36. The oil within the can extends upwardly to approximately the oil level indicated by the dotted line 37 in Figure 6.

Another action takes place on the downward stroke of the plunger 8. This action results in the placing of a locking mechanism in position to lock the switch closed when it has closed following a circuit interruption. The mechanism comprises a lever 38 having a cam actuated extension or arm 39 integral therewith. The lever 38 is bifurcated at its left-hand end, as viewed in Figures 2 and 6, and receives a pin 40 carried by a small plunger 41 slidably mounted within a cylinder 42 formed integrally with the upper yoke 9 of the magnet structure, the cylinder having a slot 40' to accommodate the pin 40. The upward motion of the piston 41 is free as the oil is admitted below the piston through the aperture 43 past an upwardly opening check valve 44. However, the downward motion of the piston 41 is delayed. Due to the weight of the piston the piston settles and the oil below the piston escapes slowly around the sides of the piston. It is to be understood that any suitable delay means for delaying the upward or downward stroke of the plunger 8 and the downward stroke of the piston 41 may be employed.

The outer or cam actuated end 39 of the lever 38 is rounded and fits within a cam slot 45 formed in the plunger 8. It is to be noted from comparison of Figures 2 and 6 that when the plunger 8 is in its uppermost position, as shown in Figure 2, the lever 38 is in its lowermost position. However, when the plunger 8 is pulled downwardly due to energization of the magnet coil 6, the lever 38 is rocked in a clockwise direction and freely raises the piston 41.

The lever 38 is provided with an upwardly extending lip or ear 46 against which a boss or projection 47 carried by a latching lever or member 48 normally bears. The latching member and the lever 38 are both pivoted upon the stationary pin 49 and a spring 50 is arranged to urge the latching lever or latching member 48 in a clockwise direction. The spring 50 is positioned between the lever 38 and the lever 48 and normally holds the lug 47 of the lever 48 in contact with the lug 46 of the lever 38 as shown in Figure 2. On the downward stroke of the plunger 8, however, the lever 38 is rocked in a clockwise direction and the spring 50 moves the latching lever or member 48 into the position shown in Figure 6. When the plunger 8 rises, the flange 51 integral with such plunger rides along the right hand face of the latch or lever member 48 and rocks the lever member 48 against the action of the spring 50. However, when the plunger 8 has arrived at its uppermost position shown in Figure 7 following a circuit interruption, the latch or lever 48 snaps beneath the flange or projecting lip 51 of the plunger 8 and thus locks the plunger against downward motion and consequently locks the switch in closed position.

This locking of the switch in closed position persists for a predetermined interval of time, depending on the length of time required for the descent of the piston 41. This time may be any desired interval. For instance a few minutes may be selected. During this time the switch remains in locked position after having been initially moved to open position as a result of a fault. After a predetermined interval of time, the piston 41 settles and thus restores the latch 48 to its initial position shown in Figure 6 and the circuit interrupter is in position to again go through the cycle of operations. It is to be noted that the settling of the plunger 41 is not opposed by the spring 50 as the spring 50 merely acts between the levers 38 and 48.

Figure 8:
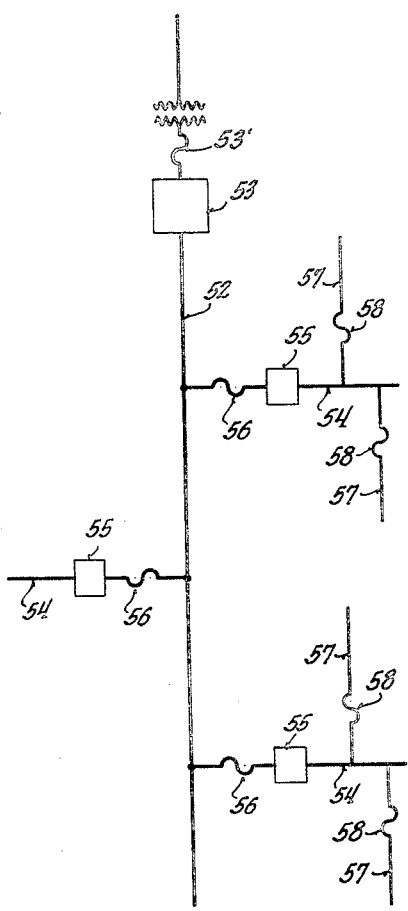
Figure 8 is a block diagram showing the manner in which the circuit interrupter is connected in the distribution system.

The manner in which the circuit interrupter is connected in the distribution system is shown in the block diagram of Figure 8. In this diagram, a main line 52 has been shown as provided with a circuit interrupter 53 which may be of the type forming the subject matter of this invention and a fuse 53' is placed ahead of the circuit interrupter. If desired, the circuit interrupter 53 may be of any of the usual types of repeating circuit interrupters. A plurality of branch lines 54 lead outwardly from the main supply line 52 and the circuit interrupters forming the subject matter of this invention are installed as indicated at 55 in each of the branch lines 54. Between the circuit interrupters and the main line 52 fuses 56 are positioned. Some or all of the branch lines 54 may be provided with tap lines or sub-branch lines 57 and fuses 58 are interposed between the branch lines 54 and the tap or sub-branch lines 57. The fuses 58 may be of the same value as the fuses 56 but are preferably of a smaller value. The circuit interrupters 55 are coordinated with the fuses 56 and 58 as to current values only but are much faster as to their time characteristics, being arranged to open in the minimum possible time, and are thus arranged to open the circuit prior to the blowing of the corresponding fuse 56 or 58. For example, if a fault occurs on one of the branch lines or sub-branch lines, the corresponding circuit interrupter 55 will suddenly open and after a suitable interval of time will close and will lock itself in closed position. If the fault was a temporary fault, which constitutes from 85% to 90% of all of the faults as hereinbefore stated, nothing further will happen and the service to the consumer will, therefore, be restored. However, if the fault is a permanent fault, the fuse 56 or 58 will blow as the circuit interrupter remains in its locked position for a predetermined interval of time as hereinbefore described. The blowing of the fuse 56 or 58 will thus isolate the branch line 54 or the sub-branch line 57. It is to be noted particularly that the fuses 58 may be of a smaller value than the fuses 56 if desired. In this instance a fault on a sub-branch line 57, if of a permanent nature, would cause blowing of the fuse 58 of that particular sub-branch line and would not disturb any other portion of the system. The circuit interrupter 53 and the fuse 53' are coordinated as to current values but not as to time characteristics, the circuit interrupter 53 opening in the minimum possible time. The current value for the circuit interrupter 53 and the fuse 53' is necessarily larger than for the fuses 56 and the circuit interrupters 55.

It will be seen, therefore, that if a permanent fault occurs on one of the sub-branch lines a permanent interruption of the main line or any of the other branch lines is avoided, and that after a suitable interval of time the circuit interrupter 55 will restore service to the branch line 54 and the remaining sub-branch line 57 associated therewith.

It will be seen that this invention provides a very simple type of circuit interrupter which is adapted to be positioned on a branch line leading from a main supply line and which is coordinated with a fuse in the branch line so as to protect the fuse from a temporary fault, but which if the fault should turn out to be a permanent fault automatically locks itself in closed position and thus causes the fuse to blow and isolate the line. However, as stated above, in view of the large number of temporary faults it will be seen that this circuit interrupter saves the fuse from blowing in from 85% to 90% of the faults.

If desired, the circuit interrupter may be provided with self-quenching spark gaps as indicated generally at 57 in Figure 1. The tank 32 may be mounted on a pole or other suitable support by means of a bracket 58, see Figure 1, formed as a unitary structure with the tank. The tank does not have to be disturbed when the circuit interrupter is removed therefrom. All that is necessary is to remove the bolts 59 which hold the cover in place and thereafter the cover may be lifted from the tank carrying with it all of the operative parts of the circuit interrupter. If desired, a suitable eyelet member 60 may be carried by the cover 33 to facilitate its removal.

It is to be noted that the switch means is located below the magnet assembly and is widely spaced from the quick motion mechanism, which latter is located above the magnet assembly. The switch assembly may be of very simple construction and the parts may be readily renewed as required. It is merely necessary to replace any burned stationary or movable contact members in a simple manner as is obvious from an inspection of Figure 5.

Ordinarily no manual means are provided with this circuit interrupter but it is obvious that manual means could be provided for operating the quick motion mechanism to cause the circuit interrupter to open when manually operated.

It will be seen that the circuit interrupter is of very simple construction and is easily and cheaply produced. One of the objects of the invention is accomplished due to this inexpensive construction as it enables such circuit interrupters to be positioned in the individual lines leading from the main distribution line with a minimum of expense.

Further as hereinabove stated, the device is wholly automatic in its action and has a quick opening and quick closing stroke, a suitable delay interval being interposed between the opening and the closing of the circuit interrupter and the latching mechanism being so arranged that it will also restore itself to its initial position after a predetermined interval of time.

It is to be noted that the device is self-contained and does not require the coaction of fuses or other electrical devices to obtain the time delay for rendering the latch means ineffective after a predetermined interval. Instead, mechanical time delay means are provided which act directly and mechanically on the latch means.

It will be seen further that a novel distribution system has been provided whereby the fuse in the individual line of a consumer, for instance, is protected for 85% to 90% of the faults that occur on such line.

Although this invention has been described in considerable detail, it is to be understood that such description is intended as illustrative rather than limiting as the invention may be variously embodied and is to be interpreted as claimed.

We claim:

1. A circuit interrupter comprising an energizing coil, an armature controlled by said coil, switch means operated by said armature to open circuit position on the occurrence of an overload, means biasing said armature towards switch closed position, latch means for latching said switch means in circuit closed position, means biasing said latch means towards latching position, restraining means normally restraining said latch means against latching motion and releasing said latch means after said circuit interrupter has executed a circuit interrupting operation, and time delay mechanical means acting directly and mechanically on said latch means for rendering said latch means ineffective after a predetermined interval of time.

2. A circuit interrupter comprising an energizing coil, a plunger adapted to be drawn into said coil upon the occurrence of an overload, switch means mounted below said coil, a switch actuating rod operatively coupled to said plunger and extending through said armature and movable independently of said armature, quick motion mechanism mounted above said coil for operating said rod, means operatively connected to said plunger and said quick motion mechanism for operating said quick motion mechanism from said armature, lost motion means between said armature and said rod for initiating opening motion of said switch means, said quick motion mechanism completing the opening motion of said switch means, normally ineffective latch means for locking said switch means in switch closed position after a circuit interrupting operation, means operated from said armature for rendering said latch means effective after a circuit opening operation of said circuit interrupter, and time delay means for restoring said latch means to its ineffective condition after a predetermined interval of time.

CARL SCHINDLER.
OLAV FROLAND.

REFERENCES CITED

The following references are of record in the file of this patent:

UNITED STATES PATENTS

| Number | Name | Date |
|---|---|---|
| 508,652 | Thomson | Nov. 14, 1893 |
| 947,981 | Stern | Feb. 1, 1910 |
| 1,380,595 | Ritz, Jr. | June 7, 1921 |
| 2,069,082 | Walle | Jan. 26, 1937 |
| 2,288,953 | Matthews | July 7, 1942 |
| 2,334,571 | Matthews | Nov. 16, 1943 |
| 2,339,025 | Matthews | Jan. 11, 1944 |
| 2,352,556 | Matthews | June 27, 1944 |
| 2,400,936 | Kradel et al. | May 28, 1946 |
| 2,405,606 | Rawlins et al. | Aug. 13, 1946 |
| 2,414,786 | Lincks et al. | Jan. 21, 1947 |